United States Patent [19]

Makita et al.

[11] Patent Number: 5,621,476
[45] Date of Patent: Apr. 15, 1997

[54] REDUCING THE EFFECTS OF NOISE IN LEVEL NUMBER TRANSFORMATION

[75] Inventors: Takeshi Makita, Yokohama; Susumu Sugiura, Atsugi; Osamu Yamada, Yokohama, all of Japan

[73] Assignee: Canon Kabushiki Kaisha, Tokyo, Japan

[21] Appl. No.: 464,367

[22] Filed: Jun. 5, 1995

Related U.S. Application Data

[62] Division of Ser. No. 243,929, May 17, 1994, Pat. No. 5,463,478.

[30] Foreign Application Priority Data

May 24, 1993 [JP] Japan ..................... 5-121211

[51] Int. Cl.⁶ ........................................ H04N 5/21
[52] U.S. Cl. .................. 348/620; 348/607; 348/571; 348/671; 358/455; 358/463; 358/521; 358/534
[58] Field of Search ..................... 348/607, 618, 348/619, 620, 621, 622, 623, 571, 671; 358/455, 456, 463, 465, 521, 534, 466; 382/252; H04N 5/21, 5/213

[56] References Cited

U.S. PATENT DOCUMENTS

| | | |
|---|---|---|
| 4,680,645 | 7/1987 | Dispoto et al. . |
| 4,823,194 | 4/1989 | Mishima et al. ............ 358/282 |
| 4,996,594 | 2/1991 | Murayama . |
| 5,025,316 | 6/1991 | Darby ....................... 348/620 |
| 5,136,376 | 8/1992 | Yagasaki et al. . |
| 5,243,443 | 9/1993 | Eschbach . |
| 5,245,678 | 9/1993 | Eschbach et al. ............ 382/50 |
| 5,252,986 | 10/1993 | Takaoka et al. . |
| 5,262,878 | 11/1993 | Esserman . |
| 5,315,326 | 5/1994 | Sugiyama . |
| 5,337,160 | 8/1994 | Jones ....................... 358/447 |
| 5,353,127 | 10/1994 | Shiau et al. . |
| 5,400,083 | 3/1995 | Mizusawa ................... 348/620 |

FOREIGN PATENT DOCUMENTS

0333520  9/1989  European Pat. Off. ....... H04N 1/411

Primary Examiner—John K. Peng
Assistant Examiner—Chris Grant
Attorney, Agent, or Firm—Fitzpatrick, Cella, Harper & Scinto

[57] ABSTRACT

An image processing apparatus prevents an increase in random noise and the like produced by distributing a transformation error, which is produced at the time of a level-number transformation, to unprocessed pixel data. Error data $X_n$ is added to pixel data, which has entered via an input unit, by an adder. Thereafter, the resulting data is subjected to a level-number transformation by a binarizing circuit. Transformation error produced at the time of the level-number transformation is calculated by an error arithmetic unit. The transformation error thus calculated is distributed to unprocessed pixel data by an error-diffusion unit, and the error is accumulated in a line buffer memory as error data. When processing of a prescribed number of lines has ended, a line-number discriminating circuit clears the error data that has been accumulated in the line buffer memory. As a result, an increase in random noise is prevented.

4 Claims, 7 Drawing Sheets

REDUCING THE EFFECTS OF NOISE IN LEVEL NUMBER TRANSFORMATION

This application is a continuation of application Ser. No. 08/243,929 filed May 17, 1994, U.S. Pat. No. 5,463,478.

BACKGROUND OF THE INVENTION

This invention relates to an image processing method and apparatus for processing image data.

In an image processing method known in the art, the number of gray levels of each color in a color image is transformed (by a level-number transformation) to two or a prescribed number while half tones are maintained in a half-tone image output of an image recording apparatus or the like. Generally, the error-diffusion method or a mean-error minimization method, which is substantially the same as the error-diffusion method, is employed as the method of transforming the number of gray levels of image data. These methods, which are applied to various image processing apparatus as binarizing methods for preserving half-tone density, execute the level-number transformation while a difference in density (a transformation error), with respect to the original pixel data, that occurs when each pixel is subjected to the level-number transformation is distributed to as yet unprocessed pixel data and accumulated.

However, in a case where the number of levels of original image data containing random noise is transformed by the above-mentioned level-number transformation method, the random noise becomes mixed with the transformation error and is thus distributed to the still unprocessed pixels, where the noise is accumulated as a result. Consequently, random noise increases and invites a marked decline in picture quality.

SUMMARY OF THE INVENTION

Accordingly, an object of the present invention is to provide an image processing method and apparatus in which it is possible to prevent an increase in random noise and the like produced by distributing an error, which is produced at the time of a gray-level transformation, to unprocessed pixel data.

According to the present invention, an image processing apparatus for attaining the foregoing object comprises input means for entering pixel data constituting image data, accumulating means for accumulating an error, which is produced when the pixel data is subjected to a level-number transformation, as error data for distributing the error to an unprocessed plurality of items of pixel data, transforming means for performing transformation of the number of levels of the pixel data based upon the entered pixel data and the error data accumulated by the accumulating means, and updating means for updating the error data, which has been accumulated by the accumulating means, to a prescribed value when a prescribed quantity of the pixel data has been transformed by the transforming means.

According to the present invention, an image processing method for attaining the foregoing object comprises an input step of entering pixel data constituting image data, an accumulating step of accumulating an error, which is produced when the pixel data is subjected to a level-number transformation, as error data for distributing the error to an unprocessed plurality of items of pixel data, a transforming step of performing transformation of the number of levels of the pixel data based upon the entered pixel data and the error data accumulated at the accumulating step, and an updating step of updating the error data, which has been accumulated at the accumulating step, to a prescribed value when a prescribed quantity of the pixel data has been transformed at the transforming step.

In the arrangement described above, the accumulating means (step) accumulates an error, which is produced at the level-number transformation of pixel data, as error data for distributing the error to pixel data not yet processed. The transforming means (step) executes the level-number transformation based upon the entered pixel data and the distributed error data. The error data is updated to a prescribed value by the updating means (step) at the moment a prescribed amount of the pixel data has been processed by the transforming means (step).

Another object of the present invention is to provide an image processing method and apparatus in which, by having the accumulating means and updating means execute their operations in units of a prescribed number of lines of the image, an increase in random noise at the time of the level-number transformation is prevented and application to a printer or display device is facilitated.

Another object of the present invention is to provide an image processing method and apparatus in which it is possible to execute the level transformation of pixel data at high speed by using a table in the transforming means, wherein the table stores values of pixel data after conversion at memory addresses specified based upon values of pixel data before conversion.

Another object of the present invention is to provide an image processing method and apparatus in which it is possible to eliminate noise contained in entered moving-picture data and output the noise to a processor of a succeeding stage.

Another object of the present invention is to provide an image processing method and apparatus in which one frame of pixel data outputted to a succeeding processor is held and compared with newly entered pixel data, wherein when the amount of change between the newly entered pixel data and the pixel data of the preceding frame is less than a predetermined value, the amount of change is processed as noise.

Another object of the present invention is to provide an image processing method and apparatus in which it is possible to eliminate noise contained in entered moving-picture data before the data is outputted to a level transforming unit, thereby reducing the effects of noise in level-transformation processing of moving-picture data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

<First Embodiment>

Figure 1:
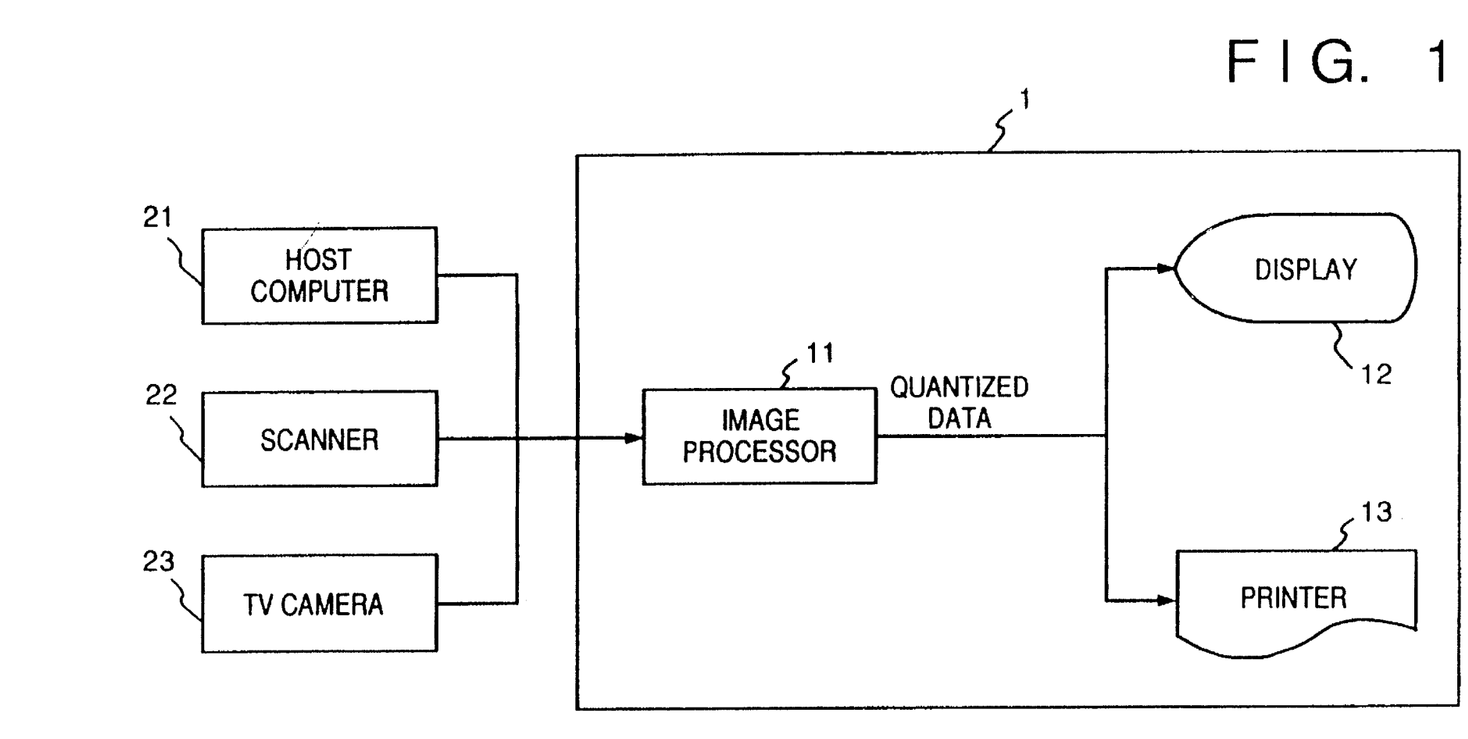
FIG. 1 is a diagram illustrating the general construction of an image forming apparatus according to an embodiment of the invention.

FIG. 1 is a diagram illustrating the general construction of an image forming apparatus according to a first embodiment of the invention. Numeral 1 in FIG. 1 denotes the main body of an image forming apparatus for applying quantization processing to image data, which has been entered from an external device, to display or record a visible image. The apparatus 1 includes an image processor 11 for quantizing the image data, which has entered from an external device, to binarized data. The image processor 11 is connected to a display unit 12, which displays the quantized data outputted by the processor 11. The display unit 12 presents a binary display for each pixel. An example of such a display unit is a ferrodielectric liquid-crystal display device (FLCD). The apparatus 1 further includes a printing unit 13 for performing printing on a recording medium based upon the quantized data outputted by the image processor 11. The printing unit 13 is a printer which performs binary printing for each pixel. An example of such a printer is a laser-beam printer or ink-jet printer.

External devices connected to the image forming apparatus are a host computer 21, a scanner 22 and a television camera 23. In this embodiment, these external devices output analog RGB data to the image forming apparatus 1 as image data. The analog RGB data mentioned here is an image signal outputted in the form of an analog signal for each of the colors R, G, B.

Figure 2:
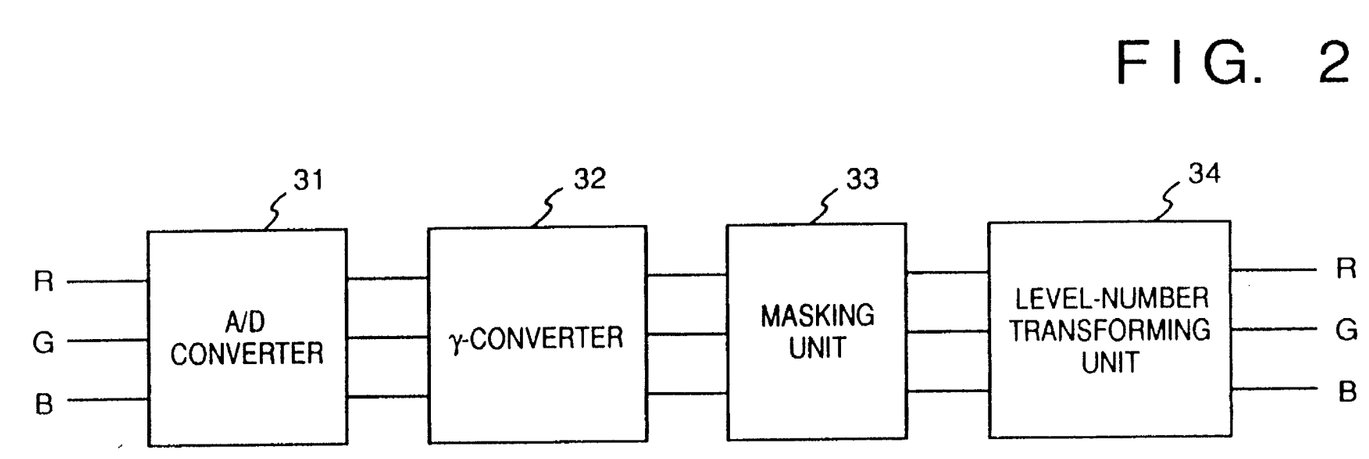
FIG. 2 is a block diagram illustrating the general functional construction of an image processing unit according to a first embodiment.

The image processor 11 will now be described. FIG. 2 is a block diagram showing the functional construction of the image processor 11.

As shown in FIG. 2, the image processor includes an A/D converter 31 for converting the analog RGB data, which has entered from an external device, into digital RGB data. The A/D converter 31 according to this embodiment converts analog data into eight-bit digital data, as a result of which 256 gray-level digital RGB data is obtained. A γ-converter 32 applies a gamma correction to the digital RGB data that has entered from the A/D converter 31. A masking unit 33 applies a color correction to the digital RGB data obtained by the gamma correction. A level-number transformation unit 34 applies a level-number transformation to the digital RGB data that has entered from the masking unit 33.

The operation of the arrangement set forth above will now be described. The analog RGB data that has entered the image processor 11 is converted to eight-bit digital RGB data of the respective colors by the A/D converter 31. Next, a gamma correction is performed by the γ-converter 32 in such a manner that the gamma characteristic of the entered digital RGB data is made to conform to the gamma characteristic of the output device. For example, in a case where RGB data having a 0.45 gamma characteristic from the television camera 23 is desired to be given a linear gamma characteristic, a gamma correction of 2.2 is applied to the input color signal.

Next, a color correction is applied to the digital RGB data by the masking unit 33. This is 3×3 linear transformation of the kind illustrated by the following equations:

$$R = m_{11} \times R' + m_{12} \times G + m_{13} \times B'$$

$$G = m_{21} \times R' + m_{22} \times G + m_{23} \times B'$$

$$B = m_{31} \times R' + m_{32} \times G + m_{33} \times B'$$

where R', G', B' represent input RGB data and R, G, B represent output RGB data.

Finally, the level-number transformation unit 34 performs a level-number transformation from the eight-bit digital RGB data of each color to one-bit RGB data of each color.

The level-number transformation unit 34 will now be described in detail with reference to FIGS. 3 and 4.

Figure 3:
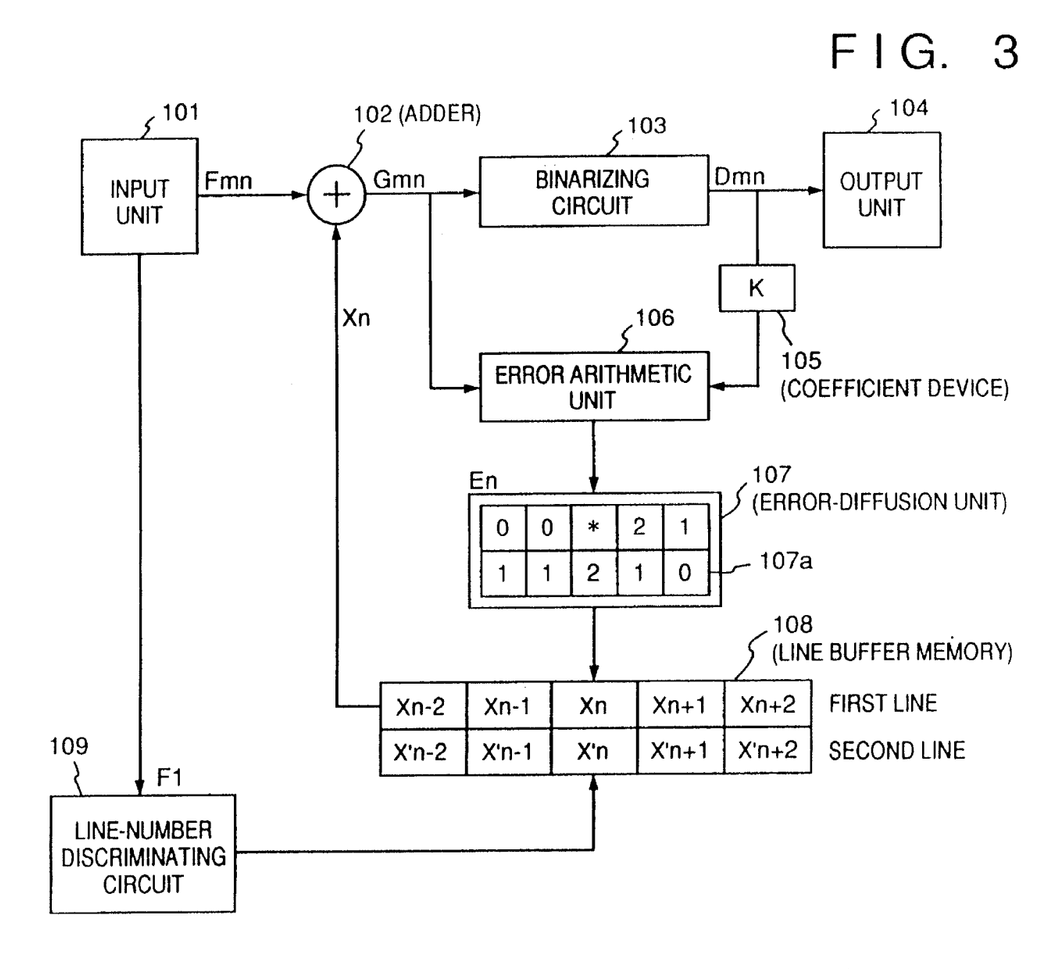
FIG. 3 is a block diagram illustrating the general construction of a level-number transforming unit.
Figure 4:
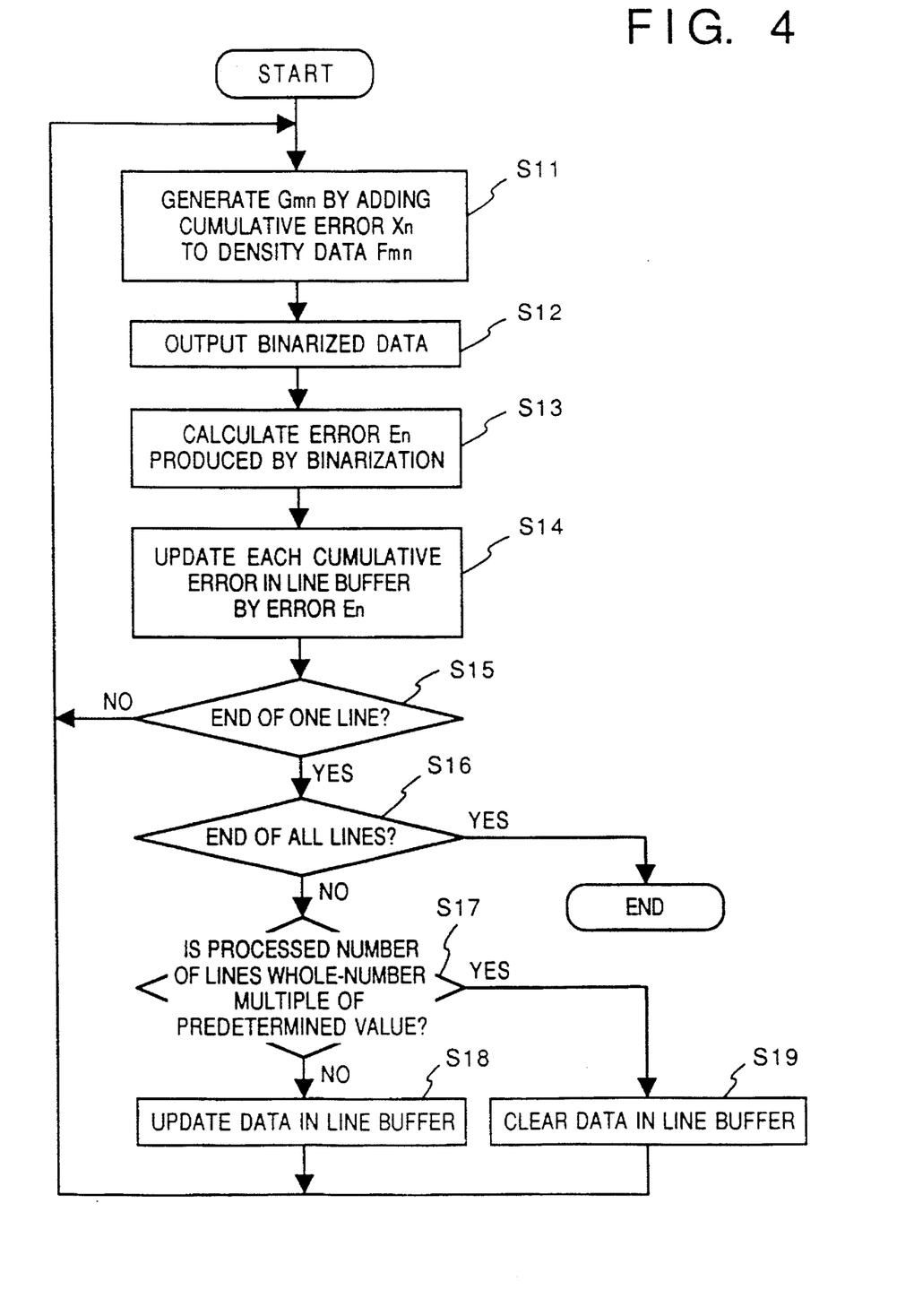
FIG. 4 is a flowchart for describing the procedure of the general construction of a level-number transforming unit according to the first embodiment.

FIG. 3 is a block diagram representing the general construction of the level-number transformation unit 34. Here an input unit 101 enters digital RGB data from the masking unit 33, separates the RGB data into data ($F_{mn}$) of each color and delivers the data $F_{mn}$ to an adder 102. Further, when the scanning of one line of the original picture ends, the input unit 101 sends a line-number discriminating circuit 109 a signal (a scan-complete signal) indicative of this fact. It should be noted that the data $F_{mn}$ is density data of a pixel whose coordinates are (m,n).

The adder 102 adds the data $F_{mn}$ outputted by the input unit 101 to a cumulative error $X_n$ obtained from a line buffer memory 108. The cumulative error Xn represents cumulative error at the coordinates (m,n). The data $G_{mn}$ outputted by the adder 102 is $F_{mn}+X_n$, which enters a binarizing circuit 103. The latter compares the value of $G_{mn}$ with a threshold level V and outputs 1 as pixel data $D_{mn}$ when $G_{mn} \geq V_{th}$ holds and 0 as the pixel data when $G_{mn} < V_{th}$ holds. The pixel data $D_{mn}$ is data which has undergone the level-number transformation. An output unit 104 on/off controls a dot in dependence upon the value (0 or 1) of $D_{mn}$, thereby outputting the transformed data.

A coefficient device 105 multiplies the output $D_{mn}$ of the binarizing circuit 103 by K and outputs the product to an error arithmetic unit 106. The coefficient K is decided by the number of bits of the digital RGB data inputted to the input unit 101 and the number of bits to which the digital RGB data is transformed by the level-number transformation. In a case where eight-bit data is entered by the input unit 101 and is transformed to one bit, as in this embodiment, the maximum density value of one dot is 255 and the value of the coefficient K in the coefficient device 105 is 255.

The error arithmetic unit 106 obtains the difference between the data ($G_{mn}$) outputted by the adder 102 and the data ($K \times D_{mn}$) outputted by the coefficient device 105 and delivers this difference as a transformation error $E_n$. More specifically, the error arithmetic unit 106 performs the calculation $E_n = K \times D_{mn} - G_{mn}$ and outputs $E_n$ to an error diffusion unit 107 as the transformation error. The error diffusion unit 107 applies a predetermined weight to the transformation error $E_n$ using a diffusion matrix 107a and distributes this as the cumulative error of each pixel stored in a line buffer memory 108, thereby accumulating the error. The line buffer memory 108 stores the cumulative error pixel by pixel in two lines, namely a line (first line) currently being scanned and a line (second line) scanned next. The transformation error weighted in accordance with the diffusion matrix 107a is cumulatively added to the cumulative error already stored pixel by pixel, and the results are stored in the line buffer memory 108.

For example, assume that already stored cumulative error $(X_{n-2} \sim X'_{n+2})$ of each pixel is stored in the line buffer memory 108 and that the error $E_n$ is produced as the result of a level-number transformation applied to a pixel at position $X_n$. In this case, the cumulative error of each pixel is updated as follows by processing in the error diffusion unit 107:

$$X_{n+1} \leftarrow X_{n+1} - \tfrac{2}{8} \times E_n$$

$$X_{n+2} \leftarrow X_{n+2} + \tfrac{1}{8} \times E_n$$

$$X'_{n-2} \leftarrow X'_{n-2} + \tfrac{1}{8} \times E_n$$

$$X'_{n-1} \leftarrow X'_{n-1} + \tfrac{1}{8} \times E_n$$

$$X'_n \leftarrow X'_n + \tfrac{2}{8} \times E_n$$

$$X'_{n+1} \leftarrow X'_{n+1} + \tfrac{1}{8} \times E_n$$

where the weighting of the error $E_n$ is in accordance with the diffusion matrix 107a. The new cumulative error $X_{n+1}$ is used at the time of the level-number transformation of the pixel at the next coordinate position (m, n+1).

In accordance with a scan-complete signal (F1) for one line of the original image outputted by the input unit 101, the line-number discriminating circuit 109 judges whether the number of lines whose processing has ended is a multiple of a predetermined value. If the number of lines is a multiple of the predetermined value, the data of the first and second lines of the line buffer memory 108 is cleared. On the other hand, if the number of lines whose processing has ended is not a multiple of the predetermined value, the data of the second line is stored in the first line of the line buffer memory 108 and the second line is cleared to 0.

The operation of the level-number transformation unit 34 having the foregoing construction will now be described in further detail with reference to the flowchart of FIG. 4. This flowchart is for describing a procedure for performing the level-number transformation of the first embodiment.

At step S11 of the flowchart, the adder 102 adds the data $F_{mn}$ and the cumulative error $X_n$ to generate the data $G_{mn}$. Next, at step S12, the binarizing circuit 103 executes binarizing processing by comparing the data $G_{mn}$ with the threshold level $V_{th}$ and outputs the binarized data $D_{mn}$ to the output unit 104. The error arithmetic unit 106 performs the calculation $K \times D_{mn} - G_{mn}$ at step S13, thereby calculating the transformation error $E_n$ produced by the binarizing processing of the preceding step S12. This is followed by step S14, at which the error diffusion unit 107 weights the transformation error $E_n$ by the diffusion matrix 107a and uses this value to update each cumulative error in the line buffer memory 108.

Next, by checking whether the scan-complete signal has been outputted by the input unit 101, it is determined at step S15 whether one line of processing of the original image has been completed. If one line of processing has not been completed, the program returns to step S11 and the foregoing processing is repeated. If one line of processing has ended, on the other hand, the program proceeds to step S16, where it is determined whether scanning has ended for all lines of the original image. Processing is terminated if the processing regarding all lines has ended. If processing regarding all lines has not ended, the program proceeds to step S17, at which it is determined whether the number of lines for which line-number transformation processing has ended is a whole-number multiple of a predetermined value. If the number of lines is not a whole-number multiple, the program proceeds to step S18, at which the content of the first line of buffer memory 108 is rewritten by the content of the second line and the content of the second line is cleared to zero. If it is found at step S17 that the number of processed lines is a whole-number multiple of a predetermined value, the program proceeds to step S19, at which the contents of the first and second lines of line buffer 108 are cleared to zero.

Binarization processing is performed by repeating execution of the processing procedure set forth above.

Thus, in accordance with the image forming apparatus of the first embodiment, as described above, cumulative error is cleared every prescribed number of lines when transformation error produced between original image data and transformed data is propagated to unprocessed data in level-number transformation of image data containing random noise. As a result, it is possible to obtain an image in which an increase in noise is suppressed.

<Second Embodiment>

In the level-number transformation unit 34 of the first embodiment, an increase in random noise is prevented. In the second embodiment, an image forming apparatus is described in which an increase in random noise is prevented in circuitry ahead of the level-number transformation unit 34 when the number of levels of a moving picture is transformed. The general construction of the image forming apparatus according to the second embodiment is in line with FIG. 1 of the first embodiment and need not be described again.

Figure 5:
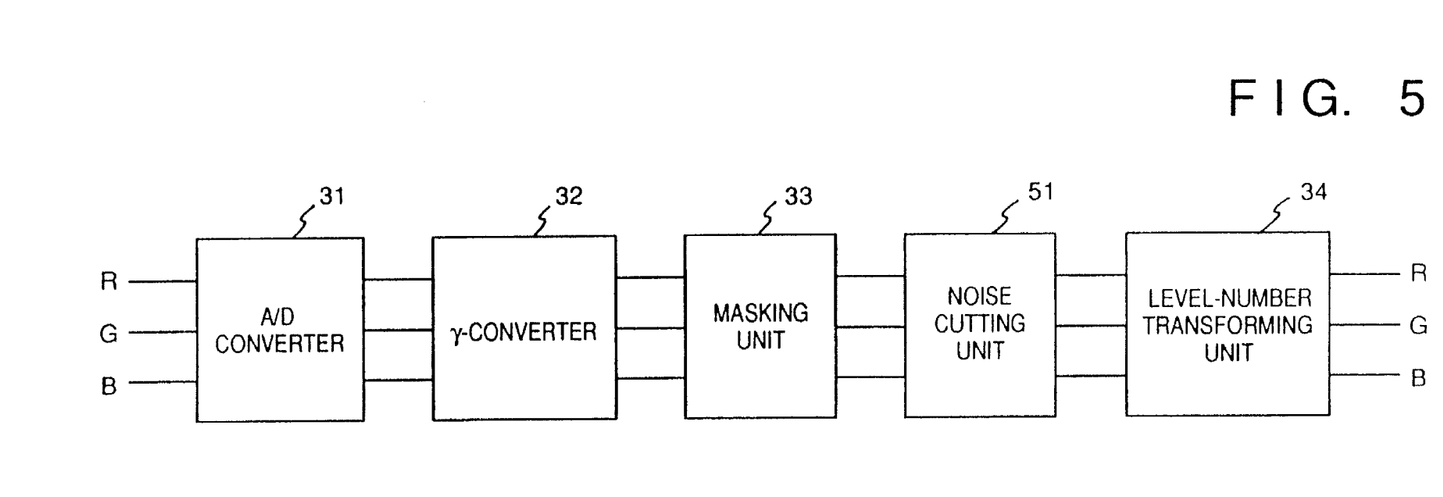
FIG. 5 is a block diagram illustrating the general functional construction of an image processing unit according to a second embodiment.

FIG. 5 is a block diagram illustrating the functional construction of the image processor 11 of the second embodiment. Blocks having functions similar to those in FIG. 2 are designated by like reference characters and need not be described again.

In FIG. 5, numeral 51 denotes a noise cutting unit for eliminating noise components contained in analog RGB data from digital RGB data that has entered from the masking unit 33. The level-number transformation unit 34 transforms eight-bit digital RGB data of each color outputted by the noise cutting unit 51 to one-bit RGB data of each color. The level-number transformation unit 34 has been described in detail in the first embodiment and need not be described again. The noise cutting unit 51 will now be described.

When a moving picture is successively processed and outputted, the noise cutting unit 51 compares the digital RGB data of the present frame with the digital RGB data of the preceding frame with regard to each pixel in the picture. When the difference between the compared data is less than a threshold value, it is judged that the amount of change is a noise component and this component is cut to eliminate it.

Figure 6:
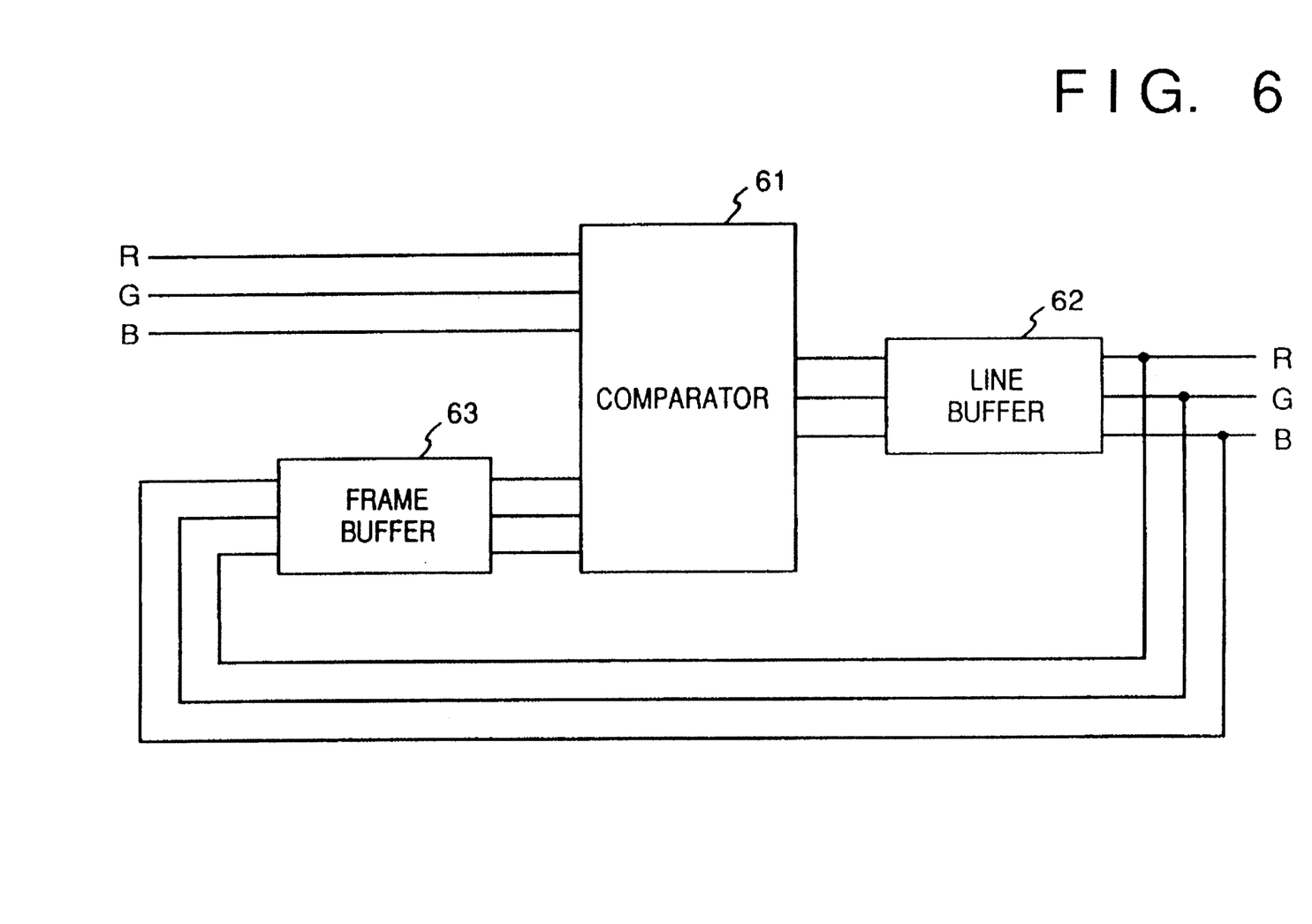
FIG. 6 is a block diagram illustrating the general construction of a noise cutting unit.

FIG. 6 is a block diagram illustrating the construction of the noise cutting unit 51. The latter includes a comparator for comparing newly entered digital RGB data (data of the present frame) and digital RGB data (data of the preceding frame) in a frame buffer 63. A line buffer 62 temporarily stores one line of RGB data. The frame buffer 63 stores the contents of the line buffer 62 line by line.

The operation of the noise cutting unit 51 will now be described with reference to the flowchart of FIG. 7. This flowchart illustrates a procedure for cutting noise according to the second embodiment.

Figure 7:
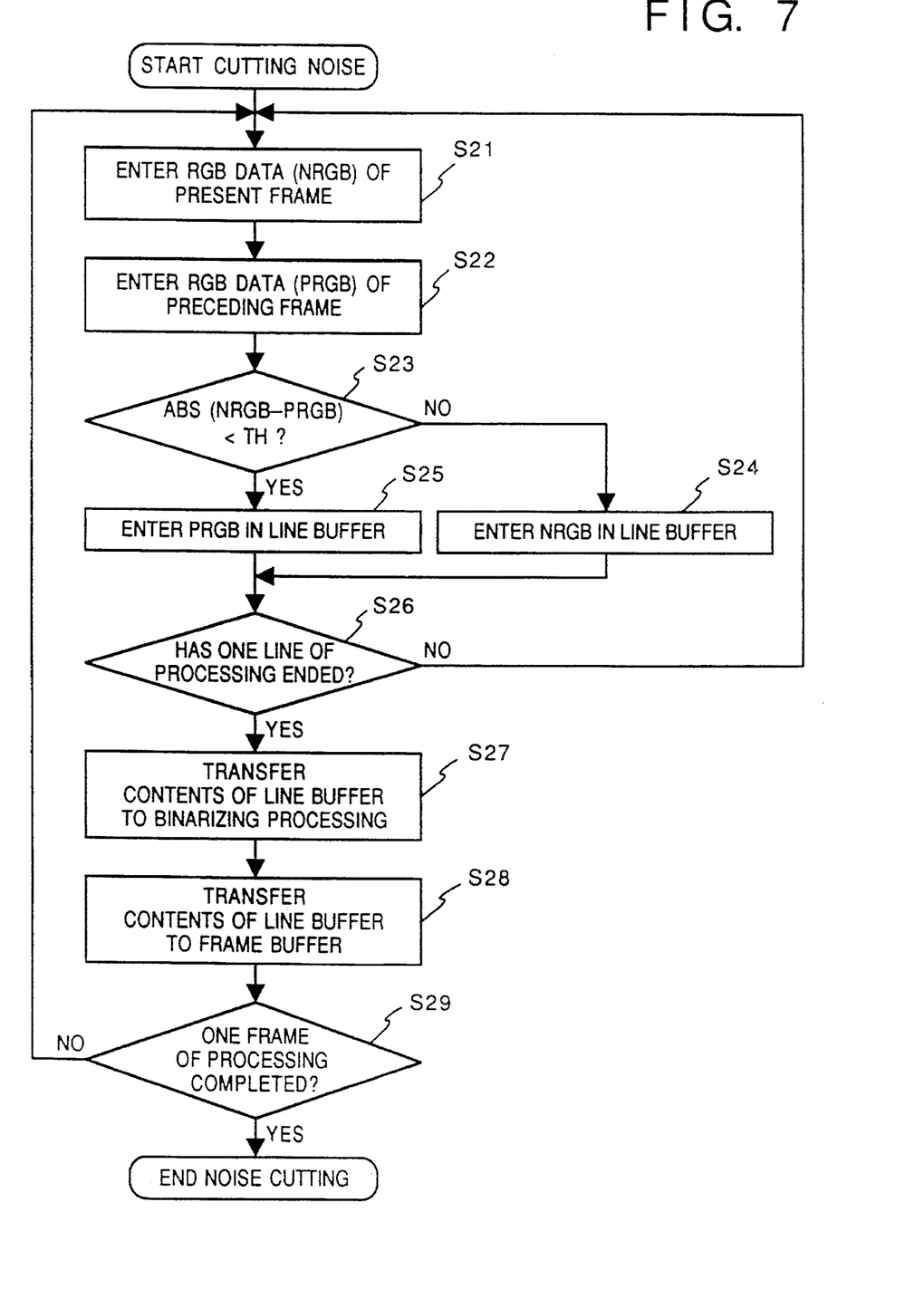
FIG. 7 is a flowchart illustrating the procedure of a noise cutting in the second embodiment.

At step S21 in FIG. 7, one line of digital RGB data (RGB data of the present frame) that has been subjected to an A/D conversion, a γ correction and masking processing successively enters the comparator 61. This is followed by step S22, at which one line of RGB data of the preceding frame stored in the frame buffer 63 successively enters the comparator 61. It should be noted that the one line of RGB data of the present frame and the one line of RGB data of the preceding frame that enter the comparator 61 represent data having the same position in the picture. The comparator 61 obtains the difference between the RGB data of the present frame and the RGB data of the preceding frame with regard to each pixel of the entered lines and judges whether the difference is greater than or less than a predetermined threshold value TH (step S23).

The judgment as to whether an RGB value has changes is performed as follows: If any of the R, G, B values is equal to or greater than the predetermined threshold value TH, for example, then it is judged that the particular RGB value has changed. Alternatively, if the sum total of the amount of change in each of the R, G, B values is equal to or greater than a predetermined value, then it is judged that an RGB value has changed. Furthermore, if either of these two criteria is satisfied, it may be judged than an RGB value has changed. Thus, various methods can be applied to make this judgment.

In a case where the aforementioned difference is equal to or greater than the predetermined threshold value TH, it is judged that the change is due to a change in the data and, hence, the program proceeds to step S25, where the RGB data of the present frame corresponding to the position of this pixel is written in the line buffer 62. If the aforementioned difference is less than the predetermined threshold value TH, on the other hand, it is judged that the change is ascribable to a noise component rather than a change in the data. Accordingly, the program proceeds to step S24, where the RGB data of the preceding frame is written in the line buffer 62. This is followed by step S26, at which it is judged whether processing regarding each pixel of one line has been concluded. The program proceeds to step S21 if processing has not been concluded and to step S26 if processing has been concluded. The processing of steps S21 to S25 is executed with regard to each pixel. When one line of processing ends, the program proceeds from step S26 to step S27, at which the RGB data is transferred to the level-number transformation unit 34, where the data is subjected to binarizing processing. The contents of the relevant line of the frame buffer 63 is updated at step S28. It is then determined at step S29 whether the processing of one frame has been completed. The processing described above is repeated for an amount of data equivalent to one frame.

In accordance with the second embodiment, as described above, pixel data to be processed is saved in the frame memory 63 in the quantization of moving-picture data containing random noise, the pixel data of the preceding frame and the pixel data of the present frame are compared and the amount of change in the pixel data is detected. If the amount of change is equal to or greater than a predetermined value, a decision is rendered to the effect that the pixel data has changed. The content of the relevant pixel data in the frame memory 63 is then updated by the pixel data of the present frame and the resulting pixel data is subjected to the level-number transformation. On the other hand, if the amount of change between the pixel data of the present frame and the pixel data of the preceding frame is less than the predetermined value, a decision is rendered to the effect that the pixel data has not changed and, as a result, the pixel data of the preceding frame is subjected to the level-number transformation. In this case the data in the frame buffer 63 is not updated. Thus, the amount of change in pixel data due to noise is detected and removed. This makes it possible to obtain a moving picture in which an increase in noise is suppressed.

More specifically, noise is eliminated from the pixel data before it enters the level-number transformation unit 34. This prevents a decline in picture quality due to the level-number transformation. In particular, in case of application of a technique such as the error-diffusion method in which transformation error is diffused to other pixels, removal of noise prior to execution of the level-number transformation is effective in preventing a decline in picture quality.

In the second embodiment, use is made of the level-number transformation unit 34 described in the first embodiment. Since noise is reduced in the stage ahead of the level-number transformation unit 34, an increase in noise is prevented in the level-number transformation so that it is possible to prevent a deterioration in picture quality ascribable to quantization and level-number transformation of the moving picture.

Further, the noise removal method illustrated in the second embodiment eliminates noise on a real-time basis owing to comparison between the entered pixel data and the pixel data of the preceding frame. As a result, this method is well suited to processing of moving-picture data.

In each of the embodiments see forth above, a processor for a binary-output device is taken as an example. However, the invention is applicable to a multiple-value output device as well. However, in the level-number transformation of a binary value, only a single comparison operation suffices. By contrast, in the level-number transformation of n values, a minimum of n−1 comparison operations is required. Accordingly, in subjecting n values to the level-number transformation, generally use is made of the following table processing:

$$D_{mn}=tbl[\text{input}]$$

where tbl is the array name, $D_{mn}$ the transformed multiple-value data, and input the input data.

This table has the structure of a one-dimensional array and is formed in n-bit units. Transformed multiple-value data is entered in each unit. That is, transformed data of n values corresponding to input data is inputted in the table beforehand at addresses indicated by the input data.

In each of the foregoing embodiments, the size of the error-diffusion matrix 107a is 5×2, though this does not impose a limitation upon the invention. Further, the values of the elements in the matrix are not limited to those of the foregoing embodiments. Furthermore, an example is described in which the pixel data prior to the level-number transformation is eight-bit data in each of the foregoing embodiments. However, this also does not impose a limitation upon the invention. In addition, though use is made of a 3×3 linear transformation in each of the embodiments with regard to masking processing, the transformation may be of multiple degree, such as a second-degree (quadratic) or third-degree (cubic) transformation.

The present invention can be applied to a system comprising either a plurality of units or to a single unit. It goes without saying that the invention is applicable also to a case which can be attained by supplying programs which execute the process defined by the present system or invention.

In accordance with the present invention as described above, there can be provided an image processing method and apparatus for preventing an increase in random noise and the like caused by distributing transformation error, which is produced when a level-number transformation is performed, to pixel data not yet processed.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

a memory medium for storing at least one frame of pixel data constituting moving-picture data and containing noise components;

detecting means for detecting an amount of change between newly entered pixel data and pixel data, of an identical position, stored in said memory medium;

removing means for removing noise components contained in the newly entered pixel data by replacing the newly entered pixel data with the pixel data stored in said memory medium when the amount of change detected by said detecting means is less than a predetermined value;

transforming means for transforming a number of gray levels of the pixel data of which noise components have been removed by said removing means; and accumulating means for accumulating an error, which is produced when the pixel data is subjected to a level-number transformation, as error data for distributing the error to a plurality of items of pixel data not yet processed, said removing means comprising selecting means for selecting pixel data stored in said memory medium when the amount of change detected by said detecting means is less than the predetermined value, and for selecting the newly entered pixel data when the amount of change detected by said detecting means is greater than or equal to the predetermined value, and directly provides data selected by said selecting means to said transforming means without processing the selected data.

2. An apparatus according to claim 1, further comprising:

updating means for updating the error data, which has been accumulated by said accumulating means, based on error data produced by the transformation performed in said transforming means;

wherein said updating means resets the error data accumulated by said accumulating means without updating the error data when the prescribed amount of the pixel data has been transformed by said transforming means, whereby an increase of noise components is prevented.

3. An image processing method comprising:

a storing step of storing in a memory medium at least one frame of pixel data constituting moving-picture data and containing noise components;

a detecting step of detecting an amount of change between newly entered pixel data and pixel data, of an identical position, stored in said memory medium;

a removing step of removing noise components contained in the newly entered pixel data by replacing the newly entered pixel data with the pixel data stored in said storing step when the amount of change detected by said detecting step is less than a predetermined value;

a transforming step of transforming a number of gray levels of the pixel data of which noise components have been removed in said removing step; and an accumulating step of accumulating an error, which is produced when the pixel data is subjected to a level-number transformation, as error data for distributing the error to a plurality of items of pixel data not yet processed, said removing step comprising a selecting step of selecting pixel data stored in the memory medium when the amount of change detected in said detecting step is less than the predetermined value, and of selecting the newly entered pixel data when the amount of change detected in said detecting step is greater than or equal to the predetermined value, and data selected in said selecting step are directly provided to said transforming step without processing the selected data in said removing step.

4. A method according to claim 3, further comprising:

an updating step of updating the error data, which has been accumulated at said accumulating step, based on error data produced by the transformation performed in said transforming step;

wherein said updating step resets the error data accumulated in said accumulating step without updating the error data when a prescribed amount of the pixel data has been transformed at said transforming step, whereby an increase of noise components is prevented.

* * * * *

UNITED STATES PATENT AND TRADEMARK OFFICE
CERTIFICATE OF CORRECTION

PATENT NO. : 5,621,476
DATED : April 15, 1997
INVENTOR(S) : Makita et al.

It is certified that error appears in the above-identified patent and that said Letters Patent is hereby corrected as shown below:

COLUMN 5:

Line 15, "$X_{n+1} \leftarrow X_{n+1} 2/8xE_n$" should read --$X_{n+1} \leftarrow X_{n+1} + 2/8 \ x \ E_n$--.

Signed and Sealed this

Thirtieth Day of September, 1997

Attest:

BRUCE LEHMAN

Attesting Officer

Commissioner of Patents and Trademarks